(12) United States Patent
Stay et al.

(10) Patent No.: US 10,521,053 B2
(45) Date of Patent: Dec. 31, 2019

(54) OVERCOATED PATTERNED CONDUCTIVE LAYER AND METHODS

(71) Applicant: 3M INNOVATIVE PROPERTIES COMPANY, St. Paul, MN (US)

(72) Inventors: Matthew S. Stay, Minneapolis, MN (US); Shawn C. Dodds, St. Paul, MN (US); Luke A. Schroeder, Maplewood, MN (US); Joan M. Noyola, Maplewood, MN (US); Nicholas D. Petkovich, Roseville, MN (US); Matthew H. Frey, Cottage Grove, MN (US); Craig R. Schardt, Woodbury, MN (US); Mikhail L. Pekurovsky, Bloomington, MN (US); Ann M. Gilman, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 64 days.

(21) Appl. No.: 15/759,246

(22) PCT Filed: Sep. 12, 2016

(86) PCT No.: PCT/US2016/051322
§ 371 (c)(1),
(2) Date: Mar. 12, 2018

(87) PCT Pub. No.: WO2017/048633
PCT Pub. Date: Mar. 23, 2017

(65) Prior Publication Data
US 2018/0253166 A1 Sep. 6, 2018

Related U.S. Application Data

(60) Provisional application No. 62/219,530, filed on Sep. 16, 2015.

(51) Int. Cl.
*G06F 3/041* (2006.01)
*G02B 1/16* (2015.01)
(Continued)

(52) U.S. Cl.
CPC ........ *G06F 3/042* (2013.01); *B29D 11/00644* (2013.01); *B29D 11/00865* (2013.01);
(Continued)

(58) Field of Classification Search
CPC ........ B29D 11/00644; B29D 11/00865; B29K 2667/003; B29K 2996/0026; G02B 1/16;
(Continued)

(56) References Cited

U.S. PATENT DOCUMENTS 6,011,653 A * 1/2000 Karasawa .......... G02B 27/0172
348/E5.145
6,975,067 B2 12/2005 McCormick
(Continued)

FOREIGN PATENT DOCUMENTS

WO    WO 2016-195981    12/2016

OTHER PUBLICATIONS

International Search Report for PCT International Application No. PCT/US2016/051322, dated Dec. 16, 2016, 4 pages.

*Primary Examiner* — Mihir K Rayan
(74) *Attorney, Agent, or Firm* — James A. Baker (57) ABSTRACT

A composite article having a conductive layer on at least a portion of a flexible substrate. Electrical connectivity between various portions of the substrate can be obtained through this conductive layer. The conductive layer comprises a conductive surface, and there is a patterned layer on at least a portion of a first region of the conductive surface. The patterned layer comprises a conductive material having a surface roughness, and is in electrical contact with the conductive surface. An overcoat layer is present on at least
(Continued)

a portion of the first region, such that the overcoat layer has a thickness less than the surface roughness, such that the conductive layer within the first region is covered by the overcoat layer, and such that at least a portion of the patterned layer substantially protrudes above the overcoat layer. The protruding portion permits electrical contact with the patterned layer, and via the conductive layer to other parts of the patterned layer and/or electrically conductive connectors to external electronic devices. Methods for forming the composite article are also disclosed. Methods of making such composite articles are also disclosed.

14 Claims, 4 Drawing Sheets (51) Int. Cl.
*G02F 1/1335* (2006.01)
*G06F 3/042* (2006.01)
*B29D 11/00* (2006.01)
*G02F 1/1333* (2006.01)
*G09G 3/36* (2006.01)
*B29K 667/00* (2006.01)

(52) U.S. Cl.
CPC ........... *G02B 1/16* (2015.01); *G02F 1/13338* (2013.01); *G02F 1/133528* (2013.01); *G06F 3/041* (2013.01); *G09G 3/3622* (2013.01); *B29K 2667/003* (2013.01); *B29K 2995/0026* (2013.01); *G02F 2001/13355* (2013.01); *G06F 2203/04103* (2013.01)

(58) Field of Classification Search
CPC ........... G02F 1/13338; G02F 1/133528; G02F 2001/13355; G06F 3/041; G06F 3/042; G06F 2203/04103; G09G 3/3622
See application file for complete search history.

(56) References Cited

U.S. PATENT DOCUMENTS

| | | | |
|---|---|---|---|
| 8,460,568 B2 | 6/2013 | David | |
| 8,623,140 B2 | 1/2014 | Yapel | |
| 8,703,232 B2 | 4/2014 | Stay | |
| 9,513,730 B2* | 12/2016 | Koo | G06F 3/041 |
| 2007/0065651 A1* | 3/2007 | Glatkowski | B82Y 30/00 |
| | | | 428/297.4 |
| 2010/0243295 A1* | 9/2010 | Allemand | B82Y 10/00 |
| | | | 174/250 |
| 2010/0295812 A1* | 11/2010 | Burns | G06F 3/0412 |
| | | | 345/174 |
| 2013/0273315 A1 | 10/2013 | Mansky | |
| 2014/0085551 A1 | 3/2014 | Koo | |

* cited by examiner

OVERCOATED PATTERNED CONDUCTIVE LAYER AND METHODS

CROSS REFERENCE TO RELATED APPLICATIONS

This application is a national stage filing under 35 U.S.C. 371 of PCT/US2016/051322, filed Sep. 12, 2016, which claims the benefit of U.S. Application No. 62/219,530, filed Sep. 16, 2015, the disclosure of which is incorporated by reference in its/their entirety herein.

BACKGROUND

Transparent conductors are used on touch screens to enable human touch or gesture interactions with computers, smart phones, and other graphics-based screen interfaces. Touch screen devices can be made by patterning (e.g., printing) a conductive material into electrical traces on a flexible substrate. Patterning of the conductive material can be performed in a roll-to-roll process where the substrate is unwound, converting operations such as printing and drying/curing are performed, and then the patterned substrate is wound again into a roll for further transport and processing. The patterned conductive layers can be connected to electronic circuit components such as, for example, flexible circuits, to form an electronic touch sensor that can be used as a component of an electronic device.

There are several approaches to patterning the conductive materials for use in electronic assemblies such as, for example, touch sensors.

As one example of an approach, the conductive material can be printed directly to form a pattern from a dispersion or ink, using standard printing processes such as, for example, ink-jet, gravure, flexographic, or screen printing. This direct printing technique produces a pattern in one step, with minimal waste. However, variations in the print thickness due to defects such as ribbing and pinholes may produce unacceptable variations in conductivity, as well as negatively impacting the optics of the sensor.

As another example of an approach, the surface of the substrate can be uniformly coated with the conductive material by forming a substantially continuous conductive layer. A resist material is then printed on the conductive layer using printing processes such as, for example, flexographic printing, gravure printing, ink jet printing, screen printing, spray coating, needle coating, photolithographic patterning, and offset printing. The patterned resist material allows selective removal of portions of the conductive layer to create a desired pattern (subtractive patterning). Selective removal is often accomplished either by wet chemical etching or laser ablation.

SUMMARY

In some manufacturing processes for display devices, for example, liquid crystal display devices, patterns of material may be deposited on a flexible substrate in layers through multiple deposition steps. Some articles require that the patterns be precisely registered on one or both sides of the substrate. To achieve accurate registration between the layers, lateral (cross web) positioning and longitudinal (down web) positioning must be maintained as the substrate moves through multiple manufacturing steps. Maintaining registration between layers formed on the substrate becomes more complex when the substrate is flexible or stretchable, and the patterns are made smaller and more intricately detailed. Various methods have been employed to improve the accuracy of these registration steps such as, for example, edge detection and the printing of fiducial marks.

In some fabrication processes, layers of conductive material are patterned, with each patterned layer separated by an insulating material. To make electrical connections to and between the conductive patterned layers in such a multi-layer construction without forming short-circuits, it can be important to create and maintain a reliable electrically conductive path, generally referred to as a via, between the non-adjacent patterned conductive patterned layers. However, precise registration between adjacent layers to form vias in a multi-layer construction can be difficult, time-consuming and expensive.

To reliably manufacture electronic touch screen devices in a roll-to-roll process using printing processes such as, for example ink-jet, gravure, flexographic, or screen printing, reliable techniques for forming vias between non-adjacent conductive layers are desirable to reduce defects and lower product costs.

The ability to perfectly encapsulate a transparent conductor (i.e. with a dielectric layer with no pinholes) with access points to underlying layers enables a variety of touch sensors and other multi-layer sensor constructions. More specifically, it enables the ability to easily layer two (or more) narrowly separated, patterned transparent conductive layers on the same side of a rigid or flexible substrate, with only microns of separation. This allows the positioning of the touch sensor in a variety of new locations in a display stack—including placing the sensor in the display stack—while dramatically thinning the overall construction of the touch sensor.

Briefly, the present disclosure describes composite articles having a conductive layer on at least a portion of a flexible substrate. Electrical connectivity between various portions of the substrate can be obtained through this conductive layer. The conductive layer comprises a conductive surface, and there is a patterned layer on at least a portion of a first region of the conductive surface. The patterned layer comprises a conductive material having a surface roughness, and is in electrical contact with the conductive surface. An overcoat layer is present on at least a portion of the first region, such that the overcoat layer has an average thickness less than the surface roughness, such that the conductive layer within the first region is covered by the overcoat layer, and such that at least a portion of the patterned layer substantially protrudes above the overcoat layer. The protrusion allows electrical contact with the patterned layer, and via the conductive layer to other parts of the patterned layer or to connectors to external devices.

Thus, in one aspect, the present disclosure provides a composite article having a conductive layer on at least a portion of a flexible substrate, wherein the conductive layer comprises a conductive surface; a patterned layer on at least a portion of a first region of the conductive surface, wherein the patterned layer comprises a conductive material having a surface roughness; an overcoat layer on at least a portion of the first region, wherein the overcoat layer has a thickness less than the surface roughness, such that the conductive layer within the first region is covered by the overcoat layer, and such that at least a portion of the patterned layer substantially protrudes above the overcoat layer.

In another aspect, the present disclosure provides a touch screen display comprising: a liquid crystal display; a composite article of the types just described, and a flexible transparent surface overlying the composite article. It should be noted that the flexible transparent surface need not be immediately adjacent to the composite article, and there may be intervening layers imparting other functionalities intervening.

In another aspect, the present disclosure provides a method of forming a composite article, comprising: forming a conductive layer on at least a portion of a flexible substrate, wherein the conductive layer comprises a conductive surface; forming a patterned layer on at least a portion of a first region of the conductive surface, wherein the patterned layer comprises a conductive material having a surface roughness; and forming an overcoat layer on at least a portion of the first region, wherein the overcoat layer has a thickness less than the surface roughness, such that the conductive layer within the first region is covered by the overcoat layer, and such that at least a portion of the patterned layer substantially protrudes above the overcoat layer.

In some exemplary embodiments, the methods described in this disclosure can enable roll-to-roll continuous patterned coating, which has significant cost and productivity benefits over batch processes. In various exemplary embodiments, the methods of the present disclosure can be used for low-cost manufacture of, for example, flexible displays, electronics, OLED's, PLEDs, touch-screens, fuel-cells, solid state lighting, photovoltaic and other complex optoelectronic devices.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF DRAWINGS

The disclosure may be more completely understood in consideration of the following detailed description of various embodiments of the disclosure in connection with the accompanying figures, in which.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Glossary

Certain terms are used throughout the description and the claims that, while for the most part are well known, may require some explanation. It should understood that:

The terms "(co)polymer" or "(co)polymers" includes homopolymers and copolymers, as well as homopolymers or copolymers that may be formed in a miscible blend, e.g., by coextrusion or by reaction, including, e.g., transesterification. The term "copolymer" includes random, block and star (e.g. dendritic) copolymers.

The term "(meth)acrylate" with respect to a monomer, oligomer or means a vinyl-functional alkyl ester formed as the reaction product of an alcohol with an acrylic or a methacrylic acid.

The term "adjoining" with reference to a particular layer means joined with or attached to another layer, in a position wherein the two layers are either next to (i.e., adjacent to) and directly contacting each other, or contiguous with each other but not in direct contact (i.e., there are one or more additional layers intervening between the layers).

By using terms of orientation such as "atop", "on", "over," "covering", "uppermost", "underlying" and the like for the location of various elements in the disclosed coated articles, we refer to the relative position of an element with respect to a horizontally-disposed, upwardly-facing substrate. However, unless otherwise indicated, it is not intended that the substrate or articles should have any particular orientation in space during or after manufacture.

By using the term "overcoated" to describe the position of a layer with respect to a substrate or other element of an article of the present disclosure, we refer to the layer as being atop the substrate or other element, but not necessarily contiguous to either the substrate or the other element.

By using the term "separated by" to describe the position of a layer with respect to other layers, we refer to the layer as being positioned between two other layers but not necessarily contiguous to or adjacent to either layer.

The terms "about" or "approximately" with reference to a numerical value or a shape means+/−five percent of the numerical value or property or characteristic, but expressly includes the exact numerical value. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The term "substantially" with reference to a property or characteristic means that the property or characteristic is exhibited to a greater extent than the opposite of that property or characteristic is exhibited. For example, a substrate that is "substantially" transparent refers to a substrate that transmits more radiation (e.g. visible light) than it fails to transmit (e.g. absorbs and reflects). Thus, a substrate that transmits more than 50% of the visible light incident upon its surface is substantially transparent, but a substrate that transmits 50% or less of the visible light incident upon its surface is not substantially transparent.

As used in this specification and the appended embodiments, the singular forms "a", "an", and "the" include plural referents unless the content clearly dictates otherwise. Thus, for example, reference to fine fibers containing "a compound" includes a mixture of two or more compounds. As used in this specification and the appended embodiments, the term "or" is generally employed in its sense including "and/or" unless the content clearly dictates otherwise.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Various exemplary embodiments of the disclosure will now be described with particular reference to the Drawings. Exemplary embodiments of the present disclosure may take on various modifications and alterations without departing from the spirit and scope of the disclosure. Accordingly, it is to be understood that the embodiments of the present disclosure are not to be limited to the following described exemplary embodiments, but are to be controlled by the limitations set forth in the claims and any equivalents thereof.

Methods of Making Overcoat Patterned Conductive Layers

In one exemplary embodiment, the present disclosure describes processes for coating discrete areas of a flexible substrate in a continuous roll-to-roll manner. In general, the methods include creating a patterned layer on at least a portion of a first region of a conductive surface. This patterned layer is conductive, and naturally has, or is contrived to have, a noticeable surface roughness. When an overcoat solution is coated on the first region to a predetermined thickness, at least a portion of the patterned layer substantially protrudes above the overcoat layer. Surprisingly, these protrusions are sufficient to provide a path to access the conductive surface.

Figure 1:
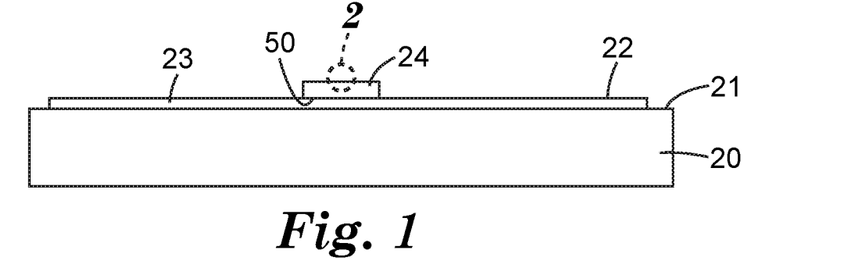
FIG. 1 is a schematic cross-sectional view of a first stage in an embodiment of a process for making an overcoat layer on a conductive surface and making an electrical connection to the conductive surface.

Referring to an embodiment of the process illustrated schematically in FIG. 1, a conductive layer 22 is disposed on a flexible substrate 20. The flexible substrate 20 can be clear or opaque, conductive or non-conductive (insulative), and suitable flexible substrates can be selected from any material that can be rolled up and processed in a roll-to-roll manufacturing process. Examples of suitable flexible substrates 20 include, but are not limited to: polyesters (e.g., polyethylene terephthalate (PET), polyester naphthalate (PEN), and polycarbonate (PC)), polyolefins (e.g., linear, branched, and cyclic polyolefins), polyvinyls (e.g., polyvinyl chloride, polyvinylidene chloride, polyvinyl acetals, polystyrene, polyacrylates, and the like), cellulose ester bases (e.g., cellulose triacetate, cellulose acetate), polysulphones such as polyethersulphone, polyimides, silicones and other conventional polymeric films. Additional examples of suitable substrates can be found in, e.g., U.S. Pat. No. 6,975,067.

Optionally, a major surface 21 of the substrate 20 underlying the conductive layer 22 can be pre-treated to prepare the surface to better receive the subsequent deposition of the conductive layer. In some embodiments, the pre-treatment step can be carried out in conjunction with a patterning step to create patterned deposition of the conductive layer 22. For example, pre-treatments can include solvent or chemical washing, heating, deposition of an optional patterned intermediate layer, as well as further surface treatments such as plasma treatment, ultraviolet radiation (UV)-ozone treatment, or corona discharge. Optionally, the substrate 20 can be pre-treated to provide a specific optical property such as a diffusing or polarizing character.

The conductive layer 22 can be applied to the substrate 20 at a given thickness selected to achieve desired optical and electrical properties. This application can be performed using known coating methods, such as, for example, slot coating, roll coating, Mayer rod coating, dip coating, curtain coating, slide coating, knife coating, gravure coating, notch bar coating or spraying, yielding a conductive nanowire layer on the substrate. The conductive layer 22 can also be deposited non-continuously using a printing technique including, but not limited to, gravure, flexographic, screen, letterpress, ink-jet printing, and the like.

Suitable materials for the conductive layer 22 include, but are not limited to, layers of metals or metal alloys of Cu, Ag, Au and the like, indium tin oxide (ITO), or layers of conductive metal or non-metallic filaments, fibers, rods, strings, strands, whiskers, or ribbons in a suitable binder. Examples of non-metallic conductive materials for the conductive layer 22 include, but are not limited to, carbon nanotubes (CNTs), metal oxides (e.g., vanadium pentoxide), metalloids (e.g., silicon), conductive polymer fibers, and the like.

The conductive layer 22 is substantially continuous over at least a portion of the first major surface 21 of the flexible substrate 20, and desirably over at least 50%, 60%, 70%, 80%, or 90% of the area of the first major surface 21. The conductive layer 22 may be coated continuously along the surface 21 of the flexible substrate 20, or may be applied in discrete blocks or rectangles, leaving uncoated substrate areas between them, with the blocks or rectangles having a size similar to the overall size of the intended touch sensor being produced. By "substantially continuous" it is meant the conductive layer 22 is applied at a sufficient density to render the surface 21 of the substrate 22 conductive, it being recognized that the surface 21 may include individual conductive areas with relatively non-conductive openings or spaces between them.

Referring again to FIG. 1, a pattern 24 of a conductive material is coated on and overlies a first region 50 of a conductive surface 23 the conductive layer 22. This patterned layer is conductive, and naturally has, or is contrived to have, a noticeable surface roughness. In some embodiments, the coating composition used to form the pattern 24 may include inks with a conductive material such as, for example, metal particles or a silver paste ink.

The coating composition used to form the pattern 24 may be coated on the conductive surface 22 by a wide variety of printing techniques such as, for example, flexographic printing, gravure coating, offset printing, screen printing, plasma deposition, photolithography, micro-contact printing, inkjet printing or selective removal of a uniform layer of the material by laser or other etching technique, optically writing with light or a laser, electrostatic spray or by plasma treatment.

Figure 2:
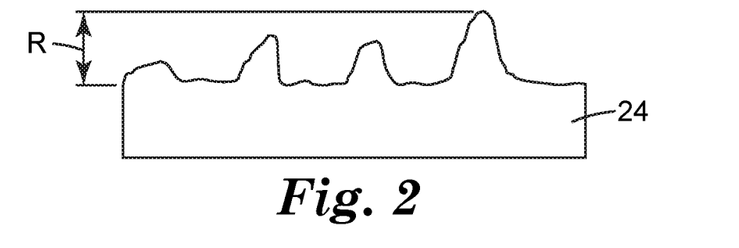
FIG. 2 is a stylized, magnified, cross-sectional view of the area called up as "Detail 2" in FIG. 1.

In various exemplary embodiments, the patterned layer 24 of the conductive material has a dry thickness of about 100 nm to about 10 micrometers (μm). Referring now to FIG. 2, a stylized, magnified, cross-sectional view of the area called up as "Detail 2" in FIG. 1 is illustrated. In this view it can be seen that the patterned layer 24 has a surface roughness "R". This surface roughness may be natural to the coated material.

Alternatively, the surface may be roughened by the addition of particles, conveniently in the size range of between about 3 to 10 μm. In another alternative, the patterned layer may be contrived to have a surface roughness by the method by which it is coated on the conductive layer 22. For example, stamping or gravure coating may induce ripple defects which in other applications are undesirable, but in the present method are deliberately caused and exploited for useful roughness. A roughness of at least 0.5 μm is desirable, with a roughness from 0.5 μm to 10 μm, or from about 2 μm to about 8 μm, or even from about 3 μm to about 6 μm being suitable.

Figure 3:
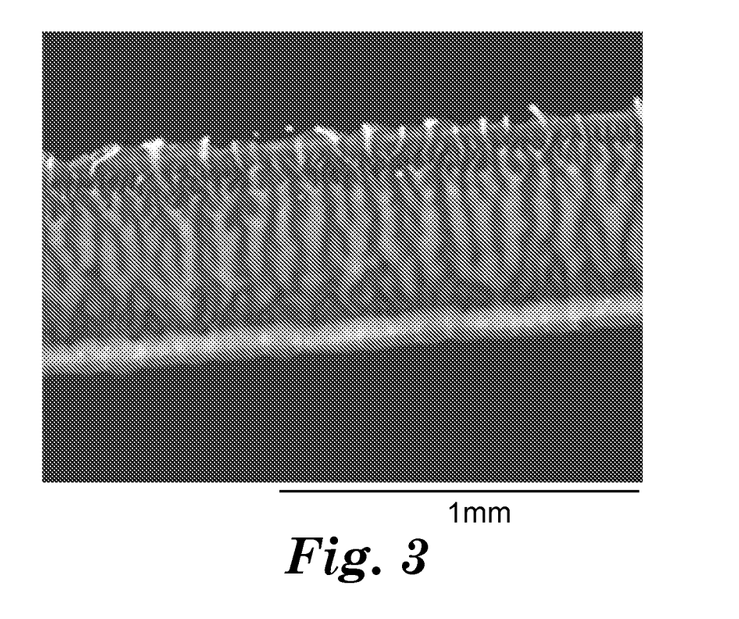
FIG. 3 is a perspective micrograph of a patterned layer on a polymeric substrate

FIG. 3 is a cross-section micrograph of a silver paste ink on a polymeric substrate similar to that discussed in Example 1 below, with the surface roughness shown at the top of the Figure.

Figure 4:
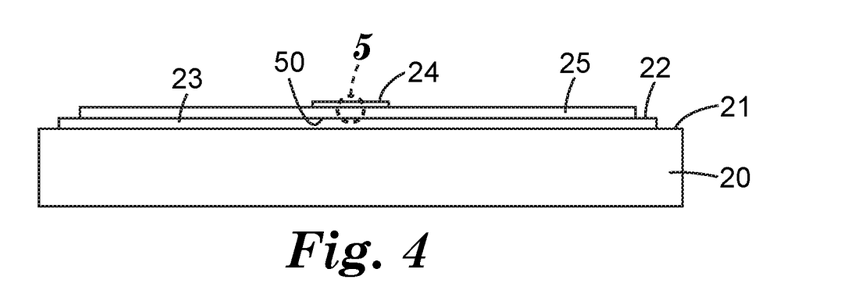
FIG. 4 is a schematic cross-sectional view of another stage in the process of FIG. 1.

Referring now to FIG. 4, a liquid overcoat composition 25 has been coated over the conductive surface 23 of the conductive layer 22, and partially over patterned layer 24 overlying the first region 50 of the surface 23. In various embodiments, the liquid overcoat composition 25 is coated to a thickness that largely covers the patterned layer 24, but allows at least some of the peaks of the surface roughness to substantially protrude. This is shown stylistically in FIG. 5.

Figure 5:
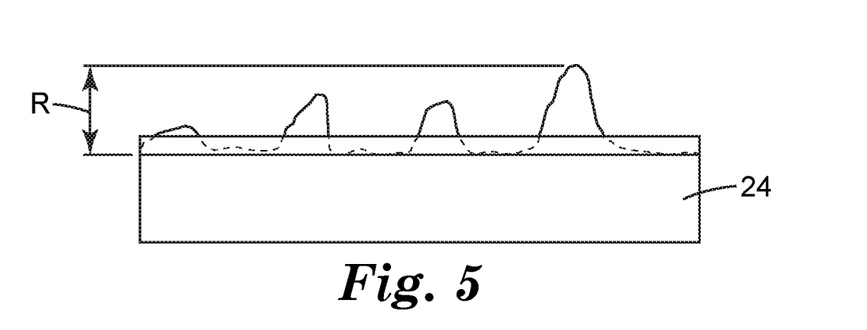
FIG. 5 is a stylized, magnified, cross-sectional view of the area called up as "Detail 5" in FIG. 4.

"Substantially protrudes" means that electrical contact can be made with the patterned layer 24 from the side of the overcoat layer 25 opposite the conductive layer 22, either because there is actual protrusion, or because the overcoat layer has thinned through capillary thinning to the point that effective electrical contact is enabled. "Capillary thinning" of liquid away from proud (i.e., projecting from a surface) features occurs because a curved air-liquid interface forms in the overcoat layers at the proud regions, which generates a pressure gradient in the overcoat layer that drives liquid away from the top of proud feature.

The liquid overcoat composition 25 may be applied to the conductive surface 23 using any suitable printing technique including, for example, flood coating, gravure coating, curtain coating, bead coating, offset printing, screen printing, inkjet printing, spraying, or by means of a blade, roller, or air knife.

The overcoat layer 25 is typically a dielectric layer, and may optionally have an optical or protective function. In some convenient embodiments, it is desirable that the overcoat be as transparent and of low haze as possible, e.g having a Transmission of >90% and a Haze lower than 2%. In other embodiments, a matte finish will be desirable, and the overcoat may be compounded or especially coated to provide a matte finish. One way of accomplishing this is disclosed in U.S. Pat. No. 8,623,140, "System and Method for Making a Film Having a Matte Finish," which is hereby incorporated by reference as if rewritten. In some convenient embodiments, the overcoat layer is a hardcoat. In particular, a hardcoat formed from monomers having multiple acrylate moieties are considered suitable. Other useful hardcoats comprise (meth)acrylate (co)polymers and nanosilica particles.

Figure 6:
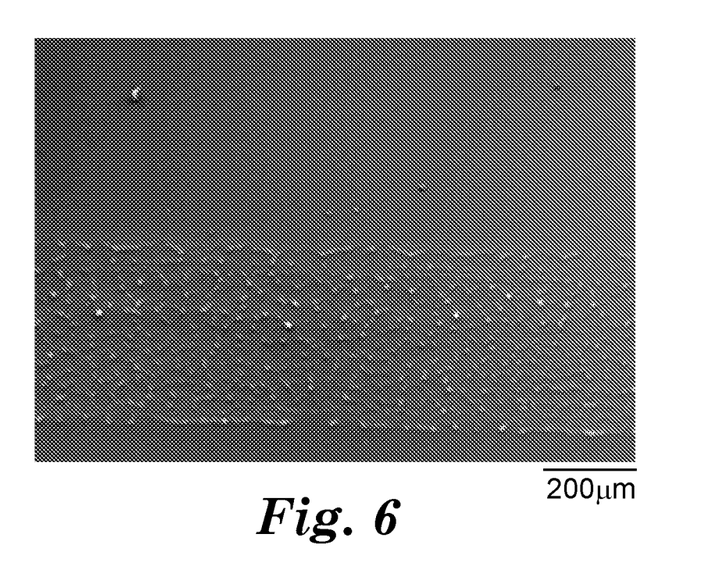
FIG. 6 is a top view micrograph of an overcoat layer above a patterned layer, with protrusions of the surface roughness emerging from the overcoat layer.
Figure 7:
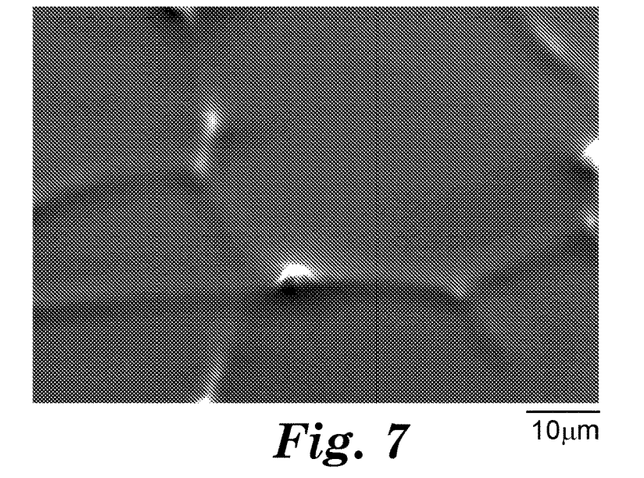
FIG. 7 is a similar view to FIG. 6 with greater magnification.

Hardcoats can be surface modified to change optical properties such as anti-reflectivity. One such technique is disclosed in U.S. Pat. No. 8,460,568, "Method for making nanostructured surfaces," which is hereby incorporated by reference as if rewritten. FIG. 6 is a perspective SEM micrograph of an overcoat layer above a patterned layer, with protrusions of the surface roughness emerging from the overcoat layer being depicted. FIG. 7 is a similar view to FIG. 5 with greater magnification.

In other exemplary embodiments, the liquid overcoat composition 25 includes a pre(co)polymer. A "pre(co)polymer" refers to a mixture of monomers or a mixture of oligomers or partial polymers that can (co)polymerize and/or crosslink to form the (co)polymeric matrix, as described herein. It is within the knowledge of one skilled in the art to select, in view of a desirable (co)polymeric matrix, a suitable monomer or partial (co)polymer.

In further exemplary embodiments, the pre(co)polymer is photo-curable, i.e., the pre(co)polymer polymerizes and/or cross-links upon exposure to irradiation such as, for example ultraviolet (UV) radiation.

The liquid overcoat composition 25 may optionally include a solvent (e.g., during application). Any non-corrosive solvent that can effectively solvate or disperse the polymeric overcoat material can be used, and examples include water, an alcohol, a ketone, an ether, tetrahydrofuran, hydrocarbons (e.g. cyclohexane) or an aromatic solvent (benzene, toluene, xylene, etc.). The solvent can be volatile, e.g., having a boiling point at atmospheric pressure of about 200° C. or less, 150° C. or less, or 100° C. or less. In some exemplary embodiments, the solvent can be essentially non-volatile, i.e., having a boiling point at atmospheric pressure of at least 200° C., at least 250° C., or at least 300° C.

In some exemplary embodiments, the liquid overcoat composition 25 may include a cross-linker, a polymerization initiator, stabilizers (including, for example, antioxidants, and UV stabilizers for longer product lifetime and polymerization inhibitors for greater shelf-life), surfactants and the like. In some embodiments, the liquid overcoat composition 25 may further include a corrosion inhibitor. In some embodiments, the liquid overcoat composition 25 is conductive, and can include a conductive polymer such as, for example, polyanilines, polythiophenes, and polydiacetylenes.

In certain exemplary embodiments, the liquid overcoat composition 25 can be cured or dried to form an optically clear material. A material is considered optically clear if the light transmission of the material is at least 80% in the visible region (400 nm-700 nm). Unless specified otherwise, all the layers (including the substrate) described herein are preferably optically clear. The optical clarity of the liquid overcoat composition 25 is typically determined by a multitude of factors, including without limitation: the refractive index (RI), thickness, smoothness, consistency of the RI throughout the thickness, surface (including interface) reflection, and scattering caused by surface roughness and/or embedded particles.

In some exemplary embodiments, the liquid overcoat composition 25 includes an ink such as those available under the trade designation FLEXOCURE FORCE (available from Flint Group, Plymouth, Minn.), as well as transparent varnishes sold under the trade designation OP Series (available from Nazdar Ink Technologies, Chicago, Ill.), SOLAR- FLEX or SUNBAR (available from Sun Chemical Co., Parsippany, N.J.), and (meth)acrylate resins (available from Sartomer, Inc., Exton, Pa.).

Overcoat Patterned Conductive Layers and Devices

In another aspect, the disclosure describes flexible substrates or films having overcoat patterned conductive layers. Such films have been found to be particularly advantageous when used in fabricating display devices. Particularly advantageous display devices include optical displays, more particularly flat screen displays including, for example, liquid crystal displays, light-emitting diode (LED) displays, plasma displays, and the like.

Particularly useful flexible substrates include an optical element, more particularly, a polarizing beam splitter. Suitable flexible substrates, optical elements, and polarizing beam splitters are described in the U.S. Pat. Application Ser. No. 62/168,205, filed on May 29, 2015, and titled "Optical Constructions," the entire disclosure of which is incorporated by reference herein in its entirety.

Figure 9:
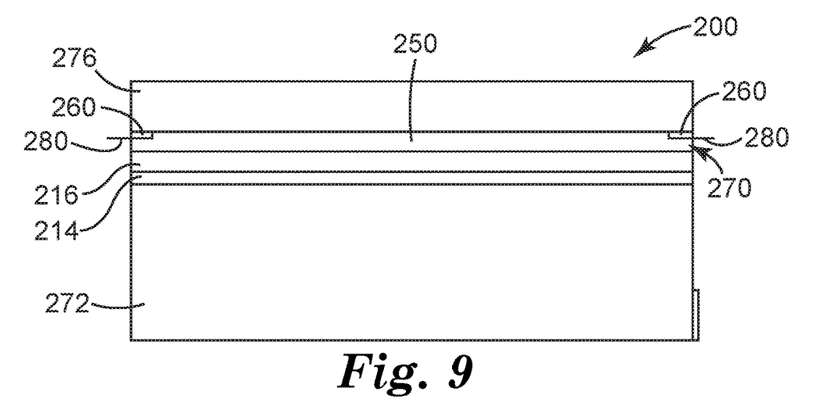
FIG. 9 is a touch screen sensor incorporating the composite article according to the present disclosure

Referring to FIG. 9, an example of a touch-screen assembly 200 includes a LCD layer 272 adjacent to a layer of glass 214, which provides a base for a composite article 270 made using the processes described above. The composite article 270 includes a conductive layer 216, which is electrically connected to flexible circuits 260 via a conductive adhesive layer 250. Electrical traces 280 on the flexible circuits 260 connect the assembly 200 to components of a display device such as a computer, mobile phone, tablet, and the like. A flexible transparent surface 276 overlying the electronic assembly construction 270 provides a point of interaction with a user of the display device.

The operation of the processes of the present disclosure will be further described with regard to the following detailed examples. These examples are offered to further illustrate the various specific and preferred embodiments and techniques. It should be understood, however, that many variations and modifications may be made while remaining within the scope of the present disclosure.

EXAMPLES

These Examples are merely for illustrative purposes and are not meant to be overly limiting on the scope of the appended claims. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Summary of Materials

Unless otherwise noted, all parts, percentages, ratios, etc. in the Examples and the rest of the specification are by weight. Solvents and other reagents used may be obtained from Sigma-Aldrich Chemical Company (Milwaukee, Wis.) unless otherwise noted.

Example 1

A flexible substrate was provided in the form of a 0.005 inch (0.13 mm) thick roll of polyethylene terephthalate (PET) film commercially available as MELINEX ST-504 from DuPont of Wilmington, Del. A conductive layer was formed on the flexible substrate by coating a mixture composed of 95% by weight of a silver nanowire ink commercially available as CLEAROHM Ink-N G4-02 from Cambrios Technologies Corporation of Sunnyvale, Calif., and 5% by weight of isopropyl alcohol commercially available from Sigma Aldrich, St. Louis, Mo., using a slot die of conventional type. The nanowire solution was coated approximately 15-25 µm thick wet, and thereafter dried so as to form a transparent conductive coating with a sheet resistance of approximately 50 Ohm/Sq., an optical transmission of 91% and a haze of approximately 1.5%. A transparent conductive substrate was thus formed.

Samples of the transparent conductive substrate were cut into rectangular coupons approximately 3 by 8 inches (7.6 cm by 20.3 cm) in size. A flexographic stamp composed of a pattern with six lines, approximately 1.0 mm wide and 25 mm in length, purchased from Southern Graphics Systems of Minneapolis, Minn., was used in connection with a 24.0 BCM anilox roll to deposit a silver ink at speed of 10 m/min to form a patterned layer. More particularly, the silver ink was a conductive nanosilver ink commercially available as NOVACENTRIX PF-500, and the printing was performed with a desktop flexographic printer commercially available as FLEXIPROOFER 100 from RK PrintCoat Instruments of Royston, Cambridgeshire, UK. After printing, the stamp coupons were placed in a batch oven for 2 minutes to evaporate the ink solvent and sinter the nanosilver print.

The samples with their patterned layer were then over-coated with a thin layer of non-conducting polymer. (In some embodiments a protective dielectric layer is wanted). More particularly a liquid precursor was prepared by mixing 10% by weight of a UV curable ink commercially available as UZS00061-408 from Flint Group Print Media North America of Batavia, Ill., with 90% by weight of glycol ether commercially available as DOWANOL from Dow Chemical Company of Midland, Mich. This precursor was over-coated onto the samples with a #8 Meyer Rod commercially available from R.D. Specialties of Webster, N.Y. This precursor was deposited to target a dried and cured overcoat layer with a thickness of approximately 1.5 to 2.5 µm, and thus thinner than the surface roughness of the patterned layer. The over-coated samples were then placed into a batch oven for 2 minutes to evaporate the solvent, then irradiated with high intensity UV light in atmosphere with a 236 Watt/cm$^2$ Fusion H bulb commercially available from Fusion UV Systems, Inc. of Gaithersburg, Md., to form the overcoat layer.

Figure 8:
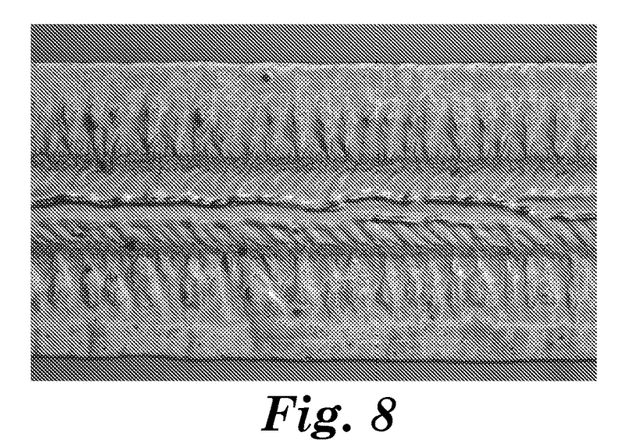
FIG. 8 is a top view micrograph of a stage in Example 1.

When the overcoat layer was cured, the samples were probed with Ohm meter contacts in both areas over the patterned layer and areas not over the patterned layer. In the portions not over the patterned layer, no electrical contact was made, indicating the over-coat layer was thick enough to prevent contact to the underlying conductive layer. However, in regions over the patterned layer, the Ohm meter could make contact to the patterned layer and from there through the underlying conductive layer to another, separated, portion of the patterned layer. A top view micrograph of one of these samples is presented in FIG. 8.

Comparative Example 1A

Samples were made according to Example 1, except that the overcoat layer was thicker, to the point that the surface roughness of the patterned layer did not protrude from the overcoat layer. More specifically the precursor was deposited targeting a dried and cured polymer thickness of approximately 5-10 µm. After curing, the overcoat layer was electrically probed as before. Electrical contact with the patterned layer was not achieved.

Example 2

A flexible substrate was provided in the form of a 0.005 inch (0.13 mm) thick roll of polyethylene terephthalate (PET) film commercially available as MELINEX ST-504 from DuPont of Wilmington, Del. A conductive layer was formed on the flexible substrate by coating a mixture composed of 95% by weight of a silver nanowire ink commercially available as CLEAROHM Ink-N G4-02 from Cambrios Technologies Corporation of Sunnyvale, Calif., and 5% by weight of isopropyl alcohol commercially available from Sigma Aldrich, St. Louis, Mo., using a slot die of conventional type. The nanowire solution was coated approximately 15-25 µm thick wet, and thereafter dried so as to form a transparent conductive coating with a sheet resistance of approximately 50 Ohm/Sq., an optical transmission of 91% and a haze of approximately 1.5%. A transparent conductive substrate was thus formed.

The transparent conductive substrate was processed in roll-to-roll fashion through a narrow-web flexographic printing line to deposit an array of patterned silver lines so as to form a patterned layer. A 0.067 inch (1.70 mm) thick elastomeric flexographic stamp commercially available as CYREL DPR from DuPont designed with lines approximately 1 mm wide, 25 mm long, and with pitches of several sizes between about 12 mm to 75 mm. The stamp was purchased from Southern Graphics Systems. The plate was mounted to an impression roll with flexographic mounting tape commercially available as E1120 from 3M Company of St. Paul, Minn. The printing press speed was set to 50 ft/min (15.24 m/min), and a nanosilver ink commercially available as PFI-722 from NovaCentrix of Austin, Tex., was printed using an 8.0 BCM/in$^2$ anilox roll. The ink solvent was evaporated and the nanosilver ink was sintered in successive air impingement and IR ovens.

Figure 10:
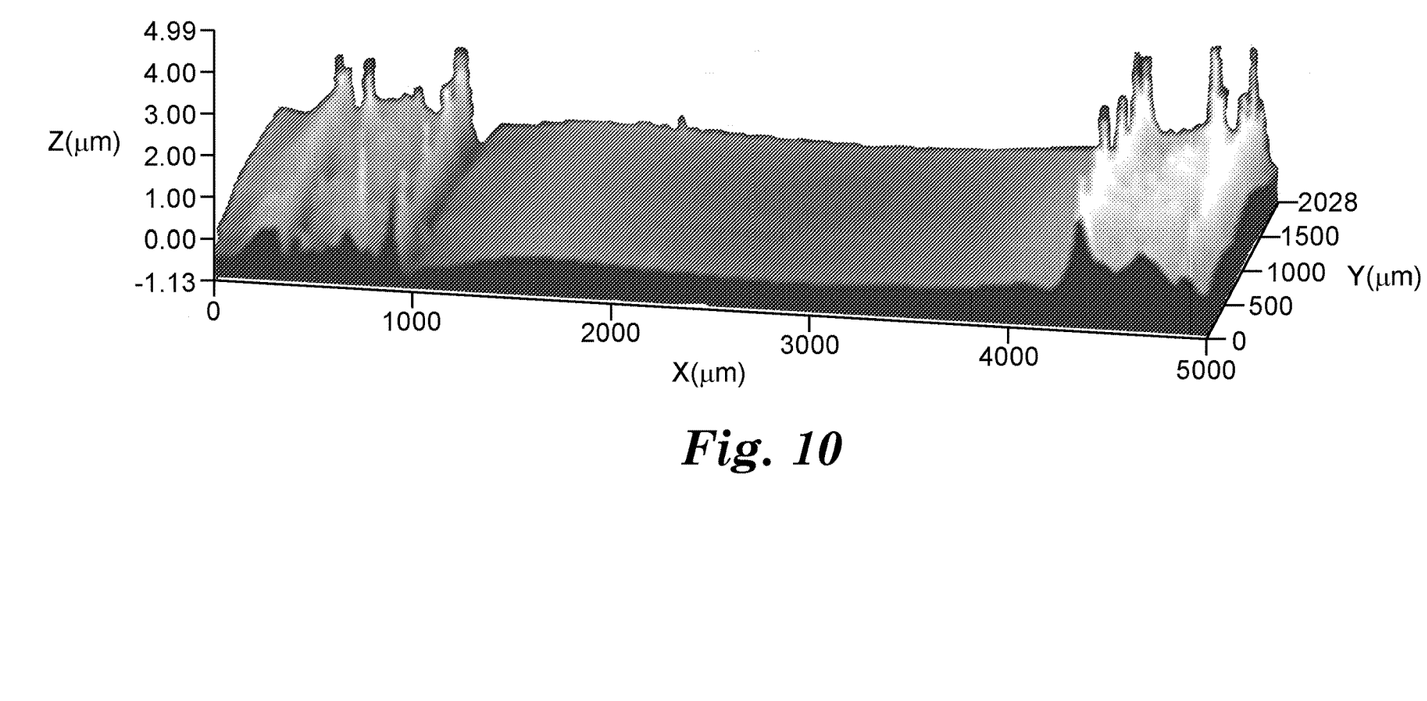
FIG. 10 is a graph of a surface height scan of a sample made according to Example 2.

A precursor for forming a dielectric hardcoat to serve an as overcoat layer was prepared by mixing 10 parts by weight of dipentaerythritol pentaacrylate commercially available as SR399 from Sartomer Americas of Exton Pa.; 10 parts by weight of 1,6 hexanediol diacrylate commercially available as SR238B from Sartomer; 2 parts by weight of an alpha hydroxy ketone photoinitiator commercially available as IRGACURE 184 from BASF Corporation of Ludwigshafen, Del.; and 80 parts by weight of glycol ether commercially available as DOWANOL from Dow Chemical. This mixture was deposited onto the transparent coated substrate over the array of silver lines via roll-to-roll coating with a slot die of conventional type. The web speed was set to 50 ft/min (15.24 m/min), and coating parameters were selected so as to deliver dried overcoat layer of 1.3 µm in thickness. This thickness was chosen so that the overcoat layer would be thinner than the surface roughness of the printed silver lines. The wet film was then passed through an air impingement oven to evaporate the glycol ether solvent, and the dielectric layer was polymerized with high intensity UV light in a nitrogen purged environment with a 236 Watt/cm$^2$ H bulb commercially available from Fusion UV Systems, Inc. FIG. 10 shows a three-dimensional cross-sectional line scan of the printed and over-coated sample, taken with a surface scanner commercially available from KLA-Tencor of Minneapolis, Minn. The scan shows that the patterned layer is structured with a surface roughness with peak to valley heights between about 0.5 and 4.0 µm.

To determine if electrical contact to the underlying transparent nanowire could be made through the conductive layer, adjacent but isolated silver lines within the patterned layer were contacted with an Ohm meter to assess the electrical resistance. In order to insure that the Ohm meter probes did not scratch the dielectric over-coating (thereby enabling contact and giving a false positive), a silver based conductive paint commercially available as SILVER PRINT II from GC Electronics of Rockford, Ill., was applied to the area over the printed lines in the patterned layer, and then dried in a batch oven. In all instances, electrical conductivity between lines occurred. However, in regions outside of the silver printed lines, contact with the Ohm meter probes resulted in infinite resistance (or no electrical conductivity), indicating that contact to the underlying transparent conductor only occurred in regions of patterned layer.

Listing of Exemplary Embodiments

Embodiment 1: A composite article, comprising: a conductive layer on at least a portion of a flexible substrate, wherein the conductive layer comprises a conductive surface; a patterned layer on at least a portion of a first region of the conductive surface, wherein the patterned layer comprises a conductive material having a surface roughness; and an overcoat layer on at least a portion of the first region, wherein the overcoat layer has a thickness less than the surface roughness, such that the conductive layer within the first region is covered by the overcoat layer, and such that at least a portion of the patterned layer substantially protrudes above the overcoat layer.

Embodiment 2: The composite article according to Embodiment 1 wherein the surface roughness is from 0.5 micrometer (µm) to 10 µm.

Embodiment 3: The composite article according to Embodiment 2 wherein the surface roughness is from about 2 µm to about 8 µm.

Embodiment 4: The composite article according to Embodiment 2 wherein the surface roughness is from about 3 µm to about 6 µm.

Embodiment 5: The composite article according to claim any of Embodiments 1 through 4 wherein the overcoat is a hardcoat formed from at least one monomer including at least one monomer with multiple (meth)acrylate moieties.

Embodiment 6: The composite article according to any of Embodiments 1 through 5, wherein the flexible substrate comprises an optical element.

Embodiment 7: The composite article according to any of Embodiments 1 to 6, wherein the patterned layer contains particles from 3 µm to 10 µm in diameter.

Embodiment 8: A touch screen display comprising: a liquid crystal display; a composite article according to any of Embodiments 1 through 7; and a flexible transparent surface overlying the composite article.

Embodiment 9: A method of forming a composite article, comprising: forming a conductive layer on at least a portion of a flexible substrate, wherein the conductive layer comprises a conductive surface; forming a patterned layer on at least a portion of a first region of the conductive surface, wherein the patterned layer comprises a conductive material having a surface roughness; and forming an overcoat layer on at least a portion of the first region, wherein the overcoat layer has a thickness less than the surface roughness, such that the conductive layer within the first region is covered by the overcoat layer, and such that at least a portion of the patterned layer substantially protrudes above the overcoat layer.

Embodiment 10: The method of Embodiment 9, wherein the flexible substrate comprises an optical element, optionally wherein the optical element is a polarizing beam splitter.

Embodiment 11: The method of Embodiment 10, wherein the overcoat layer is a hardcoat formed from one or more monomer including at least one monomer with multiple (meth)acrylate moieties.

Embodiment 12: The method of Embodiment 11, further comprising curing the overcoat layer.

Embodiment 13: The method of Embodiment 12, wherein curing the overcoat layer comprises exposing the overcoat layer to heat or a source of actinic radiation.

Embodiment 14: The method of Embodiment 13, wherein the source of actinic radiation is selected from an ultraviolet radiation source, an infrared radiation source, an electron beam source, or a gamma radiation source.

Embodiment 15. A composite film made according to the method of any one of Embodiments 9-14.

Reference throughout this specification to "one embodiment," "certain embodiments," "one or more embodiments" or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment" or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are presumed to be modified by the term "about."

Furthermore, all publications and patents referenced herein are incorporated by reference in their entirety to the same extent as if each individual publication or patent was specifically and individually indicated to be incorporated by reference. Various exemplary embodiments have been described. These and other embodiments are within the scope of the following claims.

The invention claimed is:

1. A composite article, comprising:
   a conductive layer on at least a portion of a flexible substrate, wherein the conductive layer comprises a conductive surface;
   a patterned layer on at least a portion of a first region of the conductive surface, wherein the patterned layer comprises a conductive material having a surface roughness, further wherein the surface roughness is from 0.5 micrometer (μm) to 10 μm; and an overcoat layer on at least a portion of the first region, wherein the overcoat layer has a thickness less than the surface roughness, such that the conductive layer within the first region is covered by the overcoat layer, and such that at least a portion of the patterned layer substantially protrudes above the overcoat layer.

2. The composite article according to claim 1, wherein the surface roughness is from about 2 μm to about 8 μm.

3. The composite article according to claim 2, wherein the surface roughness is from about 3 μm to about 6 μm.

4. The composite article according to claim 1, wherein the overcoat layer is a hardcoat formed from one or more monomer including at least one monomer with multiple (meth)acrylate moieties.

5. The composite article according to claim 1, wherein the flexible substrate comprises an optical element, optionally wherein the optical element is a polarizing beam splitter.

6. The composite article according to claim 1, wherein the patterned layer contains particles from 3 μm to 10 μm in diameter.

7. A touch screen display comprising:
   a liquid crystal display having first and second opposed major surfaces;
   a composite article according to claim 1 overlaying at least one major surface of the liquid crystal display; and
   a flexible transparent surface overlying the composite article.

8. A method of forming a composite article, comprising:
   forming a conductive layer on at least a portion of a flexible substrate, wherein the conductive layer comprises a conductive surface;
   forming a patterned layer on at least a portion of a first region of the conductive surface, wherein the patterned layer comprises a conductive material having a surface roughness, further wherein the surface roughness is from 0.5 micrometer (μall) to 10 μm; and
   forming an overcoat layer on at least a portion of the first region, wherein the overcoat layer has a thickness less than the surface roughness, such that the conductive layer within the first region is covered by the overcoat layer, and such that at least a portion of the patterned layer substantially protrudes above the overcoat layer.

9. The method of any claim 8, wherein the flexible substrate comprises an optical element, optionally wherein the optical element is a polarizing beam splitter.

10. The method of claim 9, wherein the overcoat layer is a hardcoat formed from one or more monomer including at least one monomer with multiple (meth)acrylate moieties.

11. The method of claim 10, further comprising curing the overcoat layer.

12. The method of claim 1, wherein curing the overcoat layer comprises exposing the overcoat layer to heat or a source of actinic radiation.

13. The method of claim 12, wherein the source of actinic radiation is selected from an ultraviolet radiation source, an infrared radiation source, an electron beam source, or a gamma radiation source.

14. A composite film made according to the method of claim 8.

* * * * *